United States Patent
Zhu et al.

(10) Patent No.: US 7,232,780 B2
(45) Date of Patent: Jun. 19, 2007

(54) YTTRIA CONTAINING HIGH-DENSITY CHROME BASED REFRACTORY COMPOSITES

(75) Inventors: Dexian Zhu, Henan (CN); Fei Shi, Henan (CN); RenPin Chen, Henan (CN); Hongda Zhang, Henan (CN); Yadong Zhang, Henan (CN)

(73) Assignee: Luoyang Institute of Refractories Research, China Iron & Steel Industry & Trade Group Corporation, Luoyang Henan (CN)

( * ) Notice: Subject to any disclaimer, the term of this patent is extended or adjusted under 35 U.S.C. 154(b) by 218 days.

(21) Appl. No.: 10/964,671

(22) Filed: Oct. 15, 2004

(65) Prior Publication Data

US 2005/0245387 A1 Nov. 3, 2005

(30) Foreign Application Priority Data

Apr. 30, 2004 (CN) ........................ 2004 1 0023983

(51) Int. Cl.
*C04B 35/105* (2006.01)
*C04B 35/505* (2006.01)

(52) U.S. Cl. ....................................... 501/127; 501/152

(58) Field of Classification Search ................ 501/126, 501/127, 152
See application file for complete search history.

(56) References Cited

U.S. PATENT DOCUMENTS 5,827,791 A * 10/1998 Pauliny et al. .............. 501/105

* cited by examiner

*Primary Examiner*—Karl Group
(74) *Attorney, Agent, or Firm*—Leong C. Lei

(57) ABSTRACT

The invention presents yttria elements containing high-density chrome based refractory composites, which consist of: (A) Fused polymeric compound as aggregate, containing: 40 to 50 wt % of particles in size from 1 to 4 mm and 15 to 25 wt % of particles in size below 1 mm; (B) A matrix consisting of fused polymeric compounds with particle sizes below 66 μm, active sintered $Al_2O_3$, active industrial $Cr_2O_3$ and $Y_2O_3$, (C) Binders accounting for 2.5 to 3.5 wt %. Since $Y_2O_3$ has resistance to the slag corrosion and penetration with its compatibility with slag, it has been introduced to activate the major component $Cr_2O_3$ crystal lattice in favor with $Al_2O_3$ so that it helps to reduce the sintering temperature, increase the rate of finished products as well as reduce the manufacturing cost.

6 Claims, No Drawings

YTTRIA CONTAINING HIGH-DENSITY CHROME BASED REFRACTORY COMPOSITES

BACKGROUND OF THE INVENTION (a) Technical Field of the Invention

This invention is related to refractory composites containing yttria ($Y_2O_3$) which form the basis of high-density chrome materials, which in turn are mainly used as the working lining material for coal and/or petroleum coke slurry gasifiers.

(b) Description of the Prior Art

Nowadays, coal and petroleum coke slurry gasifiers are widely used. Coal slurry gasification has been conventionally regarded as an economical and efficient gasification process. Another technology has also been developed, which adopts petroleum coke as the raw material. Compared with the former, it has more advantages such as higher efficiency, more available process gas yield, and lower manufacturing costs. $Cr_2O_3$ has been adopted as the main refractory for the working lining of the two kinds of gasifiers for a long period. In early times, $MgO$—$Cr_2O_3$—$ZrO_2$—$SiO_2$ was adopted, but with the development of gas processes, the lining became easily and seriously worn and corroded, resulting in a short service life. Another new material was therefore developed, called $Cr_2O_3$—$Al_2O_3$—$ZrO_2$ (containing more $Cr_2O_3$). This reduces the corrosion speed and prolongs the service life to some extent. However, $ZrO_2$ will react with $SiO_2$ and $CaO$. As a result, the compounds $ZrO_2$—$SiO_2$ and $ZrO_2$—$CaO$ lead to a bulking effect in the bricks and some cracks on the segments during the operation process owing to their low density and in spite of their high melting point. Under temperature stress and mechanical stress, those cracks are gradually widened and fragments shell from the brick surfaces into the molten slag, which speed up destruction of the bricks. When used in a petroleum coke gasifier, they will even cause more serious effects. Moreover, with its highest melting point being 2600° C., the element $ZrO_2$ in the $Cr_2O_3$—$Al_2O_3$—$ZrO_2$ material has no congruent melting point with the major content $Cr_2O_3$ except $Al_2O_3$. Thus, the product requires a higher firing temperature, which reduces the production rate and increases the cost. In addition, $ZrO_2$ includes some activated elements, such as $HfO_2$, which are harmful to human health.

SUMMARY OF THE INVENTION

The invention presents yttria elements containing high-density chrome based refractory composites, which consist of: (A) Fused polymeric compound as aggregate, containing: 40 to 50 wt % of particles in size from 1 to 4 mm and 15 to 25 wt % of particles in size below 1 mm; (B) A matrix consisting of fused polymeric compounds with particle sizes below 66 μm, active sintered $Al_2O_3$, active industrial $Cr_2O_3$ and $Y_2O_3$, (C) Binders accounting for 2.5 to 3.5 wt %. Since $Y_2O_3$ has resistance to the slag corrosion and penetration with its compatibility with slag, it has been introduced to activate the major component $Cr_2O_3$ crystal lattice in favor with $Al_2O_3$ so that it helps to reduce the sintering temperature, increase the rate of finished products as well as reduce the manufacturing cost.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

To avoid disadvantages such as susceptibility to corrosion, bulking effect, high firing temperature and radioactive damage to health, a kind of yttria ($Y_2O_3$) containing high-density chrome based refractory composites has been invented, which is mainly used as working lining material for coal and/or petroleum coke slurry gasifiers. Under the conditions of coal and/or petroleum coke slurry gasification, it shows good properties and lasts for a long time, and also displays chemical corrosion and molten slag resistance, and requires a low firing temperature, while having no bulking effect and not causing radioactive damage to human health.

The following technical formulation for the refractory composites was adopted to tackle technical problems:

Aggregates consist of fused polymeric compounds containing:
  40~50 wt % of the aggregate with particle size from 1 to 4 mm,
  15~25 wt % of the aggregate with particle size below 1 mm.

Matrix consists of fused polymeric compounds with a particle size below 66 μm, active sintered $Al_2O_3$, active industrial $Cr_2O_3$ and $Y_2O_3$ containing the following:
  16~25 wt % of fused polymeric compound with particle size below 66 μm;
  3~7 wt % of active sintered $Al_2O_3$ with particle size below 5 μm;
  4~9 wt % of active industrial $Cr_2O_3$ with particles size below 44 μm;
  0.2~5 wt % of $Y_2O_3$ particles in size below 44 μm.

Binders are added accounting for 2.5 to 3.5 wt %.

In the invention, regarding the aggregate, a fused polymeric compound with particle size ranging from 1 mm to 4 mm preferable account for 44~48 wt % in the formulation and particle size below 1 mm preferable account for 17~22 wt %.

Regarding the matrix, $Y_2O_3$ particles accounting for 0.4~2.0 wt % are preferred. Fused polymeric compound particles in size below 66 μm for 20~24%, active sintered $Al_2O_3$ for 4~6%, and active industrial $Cr_2O_3$ for 5~7% are preferred.

Aluminum di-hydrogen phosphate or other phosphates and sulphates having binder function or a mixture of the phosphates and sulphates in random with certain proportions are taken as the binder.

The $Y_2O_3$ has high resistance to leaching and chemical corrosion of the slag produced after coal or petroleum coke slurry gasification. More particularly the invention introduces $Y_2O_3$ as a favorable chemical stability against the slag medium. In other words, it performs compatibly with the slag medium. Moreover, in the $Y_2O_3$ sintering process at a high temperature, the $Cr_2O_3$ crystal lattice is activated and distorted, which accelerates the sintering speed of the complex material but no radiant material exists. The active sintered $Al_2O_3$ powder and major component $Cr_2O_3$ in the matrix form a continuous solid solution during the sintering process, which activate the $Cr_2O_3$ crystal lattice and reduce the sintering temperature visibly. Yet it is necessary to control the percentage of $Al_2O_3$ ranging from 4 to 6 wt % so that the composite material displays not only a high resistance to chemical corrosion but is also capable of sintering effectively. To sum up, the introduced $Y_2O_3$ and $Al_2O_3$ fine powders have double functions for sintering ability and the sintering temperatures are reduced considerably, by around 50~80° C. compared to the conventionally produced $Cr_2O_3$—$Al_2O_3$—$Zr_2O_3$ materials.

The invention adopts phosphate or sulphate as the binder. Phosphate is most favorable to the $Cr_2O_3$ based refractories since it has a much higher oxygen affinity than $Cr_2O_3$. Even when sintered in the thin oxygen atmosphere, the high density $Cr^{3+}$ will not be oxidized into $Cr^{5+}$ or $Cr^{6+}$ in low density. Thus, the bulking effect and the cracks are effectively prevented. Meanwhile, in the whole sintering process, the product strength rises along with temperature increase, but never falls due to the use of the binder. It can be seen that the binders are not only favorable to the composite sintering but also improve the product strength.

The pores formed by distribution of the aggregate particles in different sizes were filled by the matrix powders to obtain high packing density. The bricks are molded by a forming machine, resulting in the density of the brick green body increasing to 3.5~4.3 g/cm$^3$. They are then dried at 60~110° C. and sintering is completed in a slightly reducing atmosphere at 1630~1680° C.

According to the technology in this invention, the working lining of the gasifier effectively reduces the corrosion and invasion speed, prolongs the service life, reduces the sintering temperature, increases the production rate and reduces the manufacturing cost as well as preventing the harmful radiant materials.

The major component $Cr_2O_3$ of the sintered product accounts for 40~95% of its weight. The other physical properties are as follows:

Apparent porosity: 14~17%
Bulk density: 3.5~4.30 g/cm$^3$
Cold crushing strength 110~180 MPa The following nonrestrictive executed tests help explain the invention. The physical and chemical properties of the test and contrast test (shown in Table 1–4) are in accordance with China's national standards (GB) method and the corrosion resistance experiment is according to industrial standards.

$Cr_2O_3$: tested in accordance with the GB/T5070.10-2002 chemical analytical approach;
$Al_2O_3$: tested in accordance with the GB/T5070.4-2002 chemical analytical approach;
$Y_2O_3$: tested in accordance with the Chemical Analytical Approach for Refractories
$ZrO_2$: tested in accordance with the GB/T4078.2-2003 chemical analytical approach;
$SiO_2$: tested in accordance with the GB/T2590.3-1981 chemical analytical approach;

Apparent porosity, bulk density was tested in accordance with GB/T2997-2002 apparent porosity and bulk density experimental method for dense shaped refractory products;
CCS: tested in accordance with GB/T5072-1985 CCS experimental method for dense shaped refractory products;
Reheating linear change: tested in accordance with GB/T3907.1-1998 reheating linear experimental method for dense shaped refractory products;

Corrosion resistance experiment: The dynamic corrosion experiment for products shown in Table 1 was carried out using the rotary slag resistant method. After being cut into transverse wedge shapes, the product to be corroded was laid as columned inner lining with a diameter of 200 mm and length of 250 mm in the columned furnace casing. Rotated at 5 rpm, the hearth was heated to 1500° C. by oxyacetylene as the heater supply. 1 kg aggressive agent was added and melted firstly and 500 g was added every 30 minutes for 25 hours at 1500° C. Then the corrosion depth and penetration depth was calculated as performance of corrosion resistance after the furnace stopped running and was cooled. The chemical components of the aggressive agent were: $SiO_2$ 35.3%, CaO 34.3%, $Fe_2O_3$ 11.2%, $Al_2O_3$ 14.1%, $Na_2O$ 1.64% and MgO 1.64%.

Raw materials in the executed test were adopted below (contents are described as weight percentage):

$Y_2O_3$: A kind of rare earth oxide, which contains $Y_2O_3$ of 99.9 wt % with particle size<44 μm, average size≦4 μm and 5.0 g/cm$^3$ of density.

Active industrial $Cr_2O_3$: A kind of oxide thermally decomposed by anhydride chromic acid used as matrix, containing >99 wt % of $Cr_2O_3$ with particle size<44 μm and average size≦3 μm.

Industrial $Cr_2O_3$ used for fused polymeric compound, of which the particle size is larger than active industrial one but having the same content as the former.

Active sintered $Al_2O_3$: A kind of α-oxide obtained by lightly sintering industrial $Al_2O_3$, which contains >99 wt % of $Al_2O_3$ with particle size<5 μm and average size about 0.5 μm and >97 wt % of α-$Al_2O_3$ used as matrix. Industrial $Al_2O_3$: of which crystallographic form is γ-$Al_2O_3$, contains ≧98 wt % of $Al_2O_3$ with particle size≦500 μm, which is used as a fused polymeric compound.

$ZrO_2$ used in the contrast test example: A kind of monocline $ZrO_2$ which contains 99.5% of $ZrO_2$+$HfO_2$ with particle size<3 μm and average size about 0.4 μm.

Zircon used in the contrast test: This contains 65 wt % of $ZrO_2$ and 34 wt % of $SiO_2$ with particle size<44 μm and average size about 5 μm.

Binder: Aluminum di-hydrogen phosphate, phosphate and sulphate can be purchased from the market.

Fused polymeric compound shown in Table 1–4:

ER: A kind of fused polymeric compound which contains more than 99 wt % of $Cr_2O_3$.

ERAY: A kind of fused polymeric compound which mainly consists of:
$Cr_2O_3$—$Al_2O_3$—$Y_2O_3$ with contents of:
$Cr_2O_3$: 35~96 wt %
$Al_2O_3$: 2~65 wt %
$Y_2O_3$: 0~4%

EAR: A kind of fused polymeric compound which mainly consists of $Al_2O_3$—$Cr_2O_3$ with 83~85 wt % of $Al_2O_3$ and 14~16 wt % of $Cr_2O_3$.

In this invention, 90% of fused polymeric compound as aggregate in particle size of 4~1 mm is required and 95% in size below 1 mm.

DETAILED TEST EXAMPLES

Test 1 and Contrast Test 1

In contrast test 1, the products used in the conventional $Cr_2O_3$—$Al_2O_3$—$ZrO_2$ process were adopted.

According to the formulation, two refractory composites containing nearly 95% of $Cr_2O_3$ were made. The two mixed composites were put into a steel mould and shaped by high pressure using a friction press. After being dried at 80~100° C., the products were sintered in weakly reducing atmosphere at a temperature shown in Table 1 (the production process of the products in Table 2–4 is the same as that in Table 1). By analyzing the physical and chemical properties of the sintered products, it was concluded that with same $Cr_2O_3$ contents, the product in test 1 has a lower apparent porosity, higher bulk density, CCS and lower firing temperature down by 70° C. after being $Y_2O_3$ was added, than the product in contrast test 1 which used the normal process. In addition, the product in test 1 featured a better corrosion resistance and penetration resistance which implied that the $Y_2O_3$ addition helps to improve the sintering capacity and corrosion resistance.

Test 2 and Contrast Test 2

In contrast test 2, the products used in the conventional $Cr_2O_3$—$Al_2O_3$—$ZrO_2$ process were adopted.

Particle size distribution and physical and chemical properties of two products in test 2 are shown in Table 2. As is shown, except for the bulk density of product in test 2 being slightly lower than that in contrast test 2 (which is closely related to the $ZrO_2$ content in contrast test 2), the other figures overmatch those in contrast test 2 and the firing temperature is lower. It also indicates that the addition of $Y_2O_3$ improves the sinter ability as well as its physical properties.

Test 3 and Contrast Test 3

In contrast test 3 the products used in the conventional $Cr_2O_3$—$Al_2O_3$—$ZrO_2$ process were adopted. Two fused materials ER and EAR were used as polymeric compounds, and monocline $ZrO_2$ was added in the matrix and zircon as the source of $ZrO_2$. In test 3, the polymeric compound was fused ERAY compound. $Y_2O_3$ was added in the compound as well as in the matrix. The result in table 3 shows that the addition of $Y_2O_3$ in test 3 optimizes the apparent porosity and CCS and lowers the reheating linear change, compared with products in contrast test 3, which is related to the $Y_2O_3$ and $SiO_2$ contents. In addition, the more $SiO_2$ added in product in contrast test 3, the worse corrosion resistance performed. Meanwhile, the firing temperature of the product in test 3 fell by 50° C. caused by addition of $Y_2O_3$, which helped to improve the sinter ability.

Test 4 and Contrast Test 4

In contrast test 4 the products using the conventional $Cr_2O_3$—$Al_2O_3$—$ZrO_2$—$SiO_2$ process were adopted. Two fused materials ER and EAR were adopted as polymeric compound and zircon was added in the matrix to form composite refractory based on $Cr_2O_3$—$Al_2O_3$—$ZrO_2$—$SiO_2$. No $Y_2O_3$ was added except test 4.

As seen in Table 4, the performances are similar between test 4 and the contrast test except for the reheating linear change, which is related to the content of $SiO_2$. The addition of $Y_2O_3$ helped to improve the sinter ability and led to the lower firing temperature.

TABLE 1

| | Composition and properties | Contrast test 1 | Test 1 |
|---|---|---|---|
| Aggregate | ER 4–1 mm | 48 | 48 |
| | ER 1–0 mm | 17 | 17 |
| Matrix | ER <66 μm | 22 | 23 |
| | Active industrial $Cr_2O_3$ <44 μm | 8 | 7 |
| | Active sintered $Al_2O_3$ <5 μm | 3 | 4 |
| | Monocline $ZrO_2$ <3 μm | 2 | — |
| | $Y_2O_3$ <44 μm | — | 1.0 |
| Binder | Aluminum di-hydrogen phosphate | 3 | 3 |
| P&C properties | $Cr_2O_3$ (%) | 94.3 | 94.4 |
| | $Al_2O_3$ (%) | 3 | 4 |
| | $Y_2O_3$ (%) | — | 1 |
| | $ZrO_2$ (%) | 2 | — |
| | Apparent porosity (%) | 16 | 15 |
| | Bulk density (g/cm³) | 4.23 | 4.25 |
| | CCS (MPa) | 130 | 150 |
| | Reheating linear change (%) (1600° C., 3 h) | 0–±0.1 | 0–±0.1 |
| | Erosion resistance (mm) under 1500° C.: | | |
| | Corrosion depth | 2.5 | 2.0 |
| | Penetration depth | 10 | 7 |
| | Firing temp, ° C. | 1740 | 1670 |

Note:
95% $Cr_2O_3$ contained refractory composites adopted in Table 1

TABLE 2

| | Composition and properties | Contrast test 2 | Test 2 |
|---|---|---|---|
| Aggregate | ERAY 4–1 mm | — | 46 |
| | ERAY 1–0 mm | — | 19 |
| | ER 4–1 mm | 46 | — |
| | ER 1–0 mm | 19 | — |
| Matrix | ERAY <66 um | — | 22 |
| | ER <66 um | 18 | — |
| | Active industrial $Cr_2O_3$ <44 um | 5 | 7 |
| | Active sintered $Al_2O_3$ <5 um | 6 | 5 |
| | $Y_2O_3$ <44 um | — | 1.0 |
| | Monocline $ZrO_2$ <3 um | 6 | — |
| Binder | Aluminum di-hydrogen phosphate | 3 | 3 |
| P&C properties | $Cr_2O_3$ (%) | 87.4 | 87.8 |
| | $Al_2O_3$ (%) | 6 | 9.3 |
| | $Y_2O_3$ (%) | — | 2.7 |
| | $ZrO_2$ (%) | 6 | — |
| | Apparent porosity (%) | 16 | 15 |
| | Bulk density (g/cm³) | 4.22 | 4.21 |
| | CCS (MPa) | 140 | 155 |
| | Reheating linear change (%) (1660° C., 3 h) | 0–±0.15 | 0–±0.1 |
| | Firing temperature, ° C. | 1730 | 1670 |

Note:
86% $Cr_2O_3$ contained refractory composites adopted in Table 2

TABLE 3

| | Composition and properties | Contrast test 3 | Test 3 |
|---|---|---|---|
| Aggregate | ERAY 4–1 mm | — | 45 |
| | ERAY 1–0 mm | — | 20 |
| | ER 4–1 mm | 45 | — |
| | ER 1–0 mm | 5 | — |
| | EAR 1–0 mm | 15 | — |
| Matrix | ERAY <66 um | — | 21 |
| | ER <66 um | 5 | — |
| | Active industrial $Cr_2O_3$ <44 um | 5 | 7 |
| | Active sintered $Al_2O_3$ <5 um | 9 | 6 |
| | $Y_2O_3$ <44 um | — | 1.0 |
| | Monocline $ZrO_2$ <3 um | 4 | — |
| | Zircon <44 um | 12 | — |
| Binder | Aluminum di-hydrogen phosphate | 3 | 3 |

TABLE 3-continued

|  | Composition and properties | Contrast test 3 | Test 3 |
|---|---|---|---|
| P&C properties | $Cr_2O_3$ (%) | 61.7 | 61.1 |
|  | $Al_2O_3$ (%) | 22 | 35.2 |
|  | $Y_2O_3$ (%) | — | 3.6 |
|  | $ZrO_2$ (%) | 11.8 | — |
|  | $SiO_2$ (%) | 4.1 | — |
|  | Apparent porosity (%) | 15 | 14 |
|  | Bulk density (g/cm³) | 3.95 | 3.92 |
|  | CCS (Mpa) | 129 | 135 |
|  | Reheating linear change (%) (1600° C., 3 h) | 0~±0.2 | 0~±0.1 |
|  | Firing temp. (° C.) | 1710 | 1660 |

Note:
60% $Cr_2O_3$ contained refractory composites adopted in Table 3

TABLE 4

|  | Composition and properties | Contrast test 4 | Test 4 |
|---|---|---|---|
| Aggregate | ERAY 4–1 mm | — | 46 |
|  | ERAY 1–0 mm | — | 19 |
|  | EAR 4–1 mm | 46 | — |
|  | EAR 1–0 mm | 5 | — |
|  | ER 1–0 mm | 14 | — |
| Matrix | ERAY <66 um | — | 22 |
|  | ER <66 um | 15 | — |
|  | Active industrial $Cr_2O_3$ <44 um | 6 | 7 |
|  | Active sintered $Al_2O_3$ <5 um | 4 | 5 |
|  | $Y_2O_3$ <44 um | — | 1.0 |
|  | Zircon <44 um | 10 | — |
| Binder | Aluminum di-hydrogen phosphate | 3 | 3 |
| P&C properties | $Cr_2O_3$ (%) | 41.9 | 41.0 |
|  | $Al_2O_3$ (%) | 47.3 | 56.0 |
|  | $Y_2O_3$ (%) | — | 2.7 |
|  | $ZrO_2$ (%) | 6.5 | — |
|  | $SiO_2$ (%) | 3.4 | — |
|  | Apparent porosity (%) | 16 | 15 |
|  | Bulk density (g/cm³) | 3.6 | 3.55 |
|  | CCS (Mpa) | 135 | 140 |
|  | Reheating linear change (%) (1600° C., 3 h) | 0~±0.2 | 0~±0.1 |
|  | Firing temp. ° C. | 1700 | 1650 |

Note:
40% $Cr_2O_3$ contained refractory composites adopted in Table 4

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. Yttria containing high-density chrome based refractory composites consisting of:
    (A) fused polymeric compounds as aggregates, containing:
        (a) 40 to 50 wt % of particles in size from 1 to 4 mm;
        (b) 15 to 25 wt % of particles in size below 1 mm;
    (B) matrix consisting of fused polymeric compounds with particle sizes of below 66 μm, active sintered $Al_2O_3$, active industrial $Cr_2O_3$ and $Y_2O_3$ containing as follows:
        (a) 16 to 25 wt % of fused polymeric compound particles in size below 66 μm;
        (b) 3 to 7 wt % of active sintered $Al_2O_3$ particles in size below 5 μm;
        (c) 4 to 9 wt % of active industrial $Cr_2O_3$ particles in size below 44 μm;
        (d) 0.2 to 5 wt % of $Y_2O_3$ particles in size below 44 μm;
        (e) binders being added accounting for 2.5 to 3.5 wt %.

2. The yttria containing high-density chrome based refractory composites according to claim 1 wherein the fused polymeric compound as aggregates containing 44~48 wt % of particles in size from 1 mm to 4 mm and 17~22 wt % of particles in size below 1 mm.

3. The yttria containing high-density chrome based refractory composites according to claim 1 wherein the matrix contains 0.4~2.0 wt % of $Y_2O_3$ particles, 20~24 wt % of fused polymeric compound particles in size below 66 μm, 4~6 wt % of active sintered $Al_2O_3$ and 5~7 wt % of active industrial $Cr_2O_3$.

4. The yttria containing high-density chrome based refractory composites according to claim 1 wherein aluminum di-hydrogen phosphate or other phosphate and sulphate or mixture in two in random with certain proportion are taken as the binder.

5. The yttria containing high-density chrome based refractory composites according to claim 1 wherein $Cr_2O_3$ accounts for 40~95 wt % of the composite.

6. The yttria containing high-density chrome based refractory composites according to claim 1 wherein the material is molded with a forming machine, dried at 60~110° C. and then sintered in a slightly reducing atmosphere at 1630~1680° C.

* * * * *